(No Model.) 2 Sheets—Sheet 1.
J. P. MONNETT.
BAND CUTTER.
No. 452,277. Patented May 12, 1891.
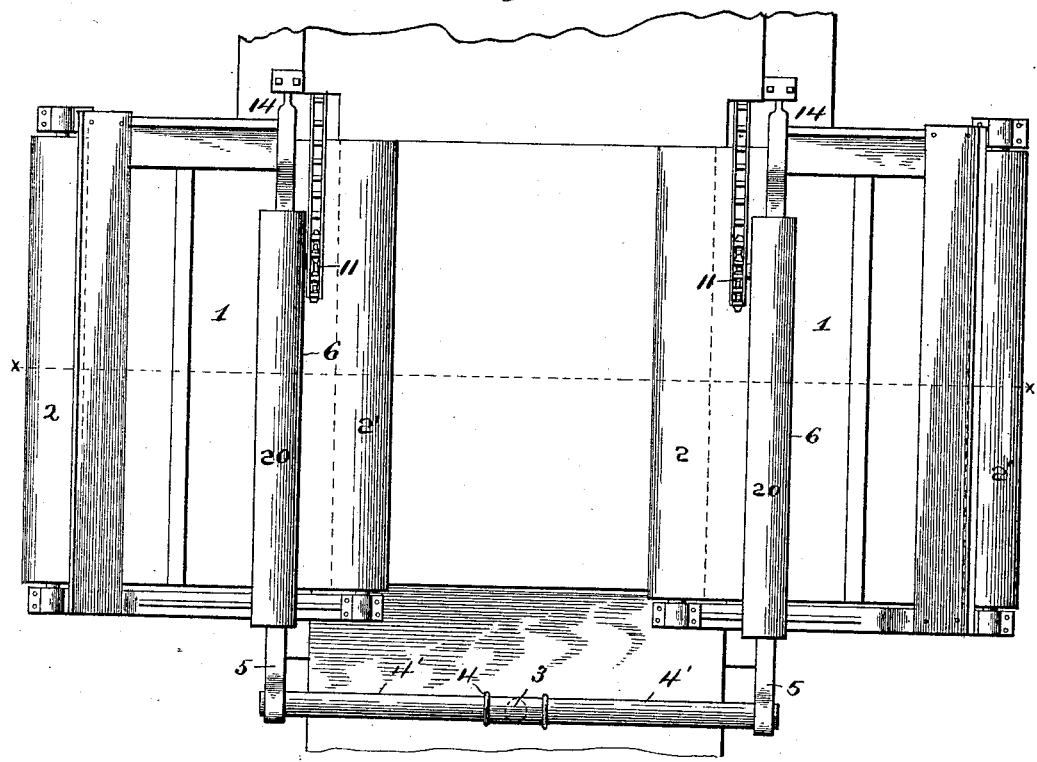
Fig. I.
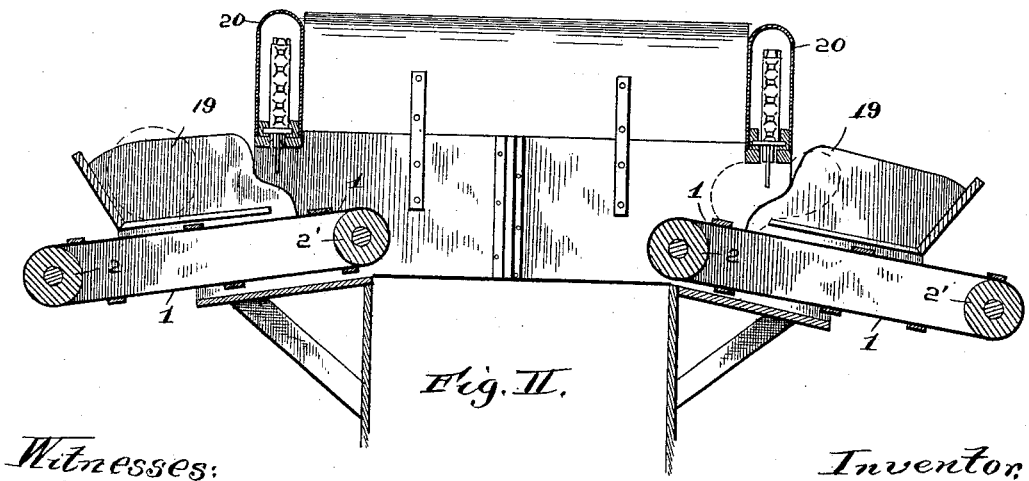
Fig. II.
Witnesses:
J. B. McGirr.
H. T. Brunkers
Inventor,
John P. Monnett
By his Attorneys,
Edson Bros.
THE NORRIS PETERS CO., PHOTO-LITHO., WASHINGTON, D. C.

(No Model.) 2 Sheets—Sheet 2.
J. P. MONNETT.
BAND CUTTER.
No. 452,277. Patented May 12, 1891.
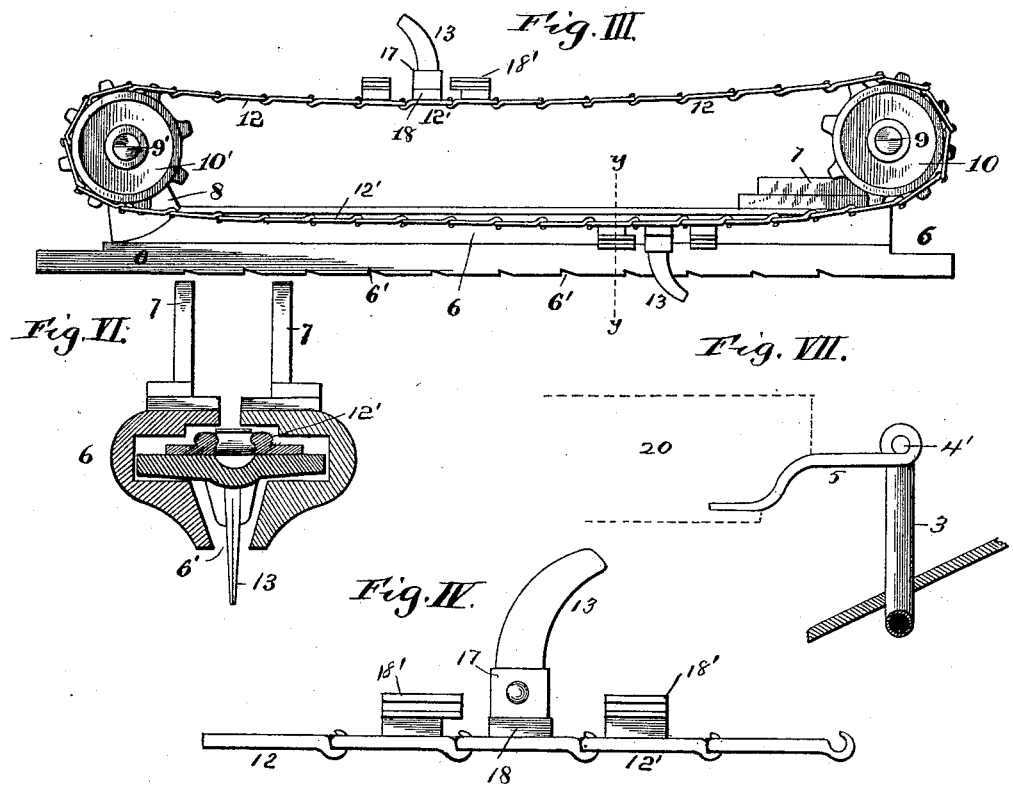
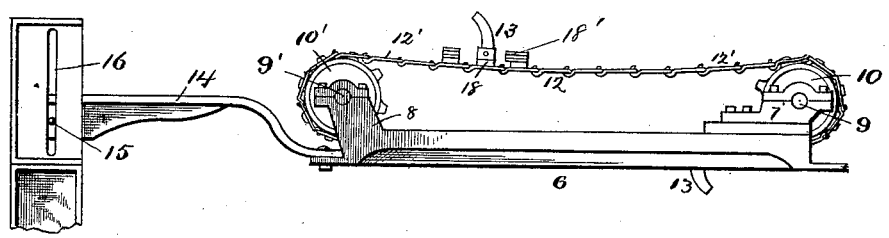
Witnesses:
Inventor
John P. Monnett
By his Attorneys,
Edson Bros.

UNITED STATES PATENT OFFICE.

JOHN P. MONNETT, OF BUCYRUS, OHIO.

BAND-CUTTER.

SPECIFICATION forming part of Letters Patent No. 452,277, dated May 12, 1891.

Application filed September 16, 1890. Serial No. 365,157. (No model.)

*To all whom it may concern:*

Be it known that I, JOHN P. MONNETT, a citizen of the United States, residing at Bucyrus, in the county of Crawford and State of Ohio, have invented certain new and useful Improvements in Band-Cutters; and I do hereby declare the following to be a full, clear, and exact description of the invention, such as will enable others skilled in the art to which it appertains to make and use the same.

My invention relates to improvements in band-cutting mechanism for thrashing-machines; and it has for its object to provide a simple and effective means for conveying the sheaf of grain to be thrashed to the throat or hopper of the machine and to automatically cut or sever the band which binds the sheaf together and thus loosen the grain and permit it to be fed in a loose condition to the agitating and thrashing mechanism of the machine.

A further object of my invention is to provide mechanism which will operate with equal efficiency on sheaves or bundles of grain of different sizes and diameters.

With these and other ends in view my invention consists in the combination of devices and the peculiar construction and arrangement of parts, as will be hereinafter fully described and claimed.

In order that others may understand my invention, I will now proceed to a detailed description thereof, in connection with the accompanying drawings, in which—

Figure I is a plan view showing my improvements applied to a thrashing-machine. Fig. II is a transverse section on the line $x\ x$ of Fig. I. Fig. III is a detail view of one of the cutter-carrying chains or belts with a portion of its casing removed. Fig. IV is a detail view of one of the cutters or knives and the means for supporting the same in position on the chain or belt, and Fig. V is a detail view of the means for supporting the cutter-carrying belts on the machine. Fig. VI is a transverse section through the cutting mechanism on the line $y\ y$ of Fig. III, and Fig. VII is a detail view of the upright rod 3 in front of the machine and the means for connecting the cutting mechanism to the horizontal rod 4' carried thereby.

Like numerals of reference denote corresponding parts in all the figures of the drawings, referring to which—

1 designates an endless conveying-apron which passes around rollers 2 2', journaled in suitable supports or bearings on the side of the throat or hopper of a thrashing-machine. To enable the attendant to feed the sheaves of grain to the machine on either side thereof, I provide two of these endless conveying-aprons 1, one on each side of the throat thereof, and each apron is arranged in a vertically-inclined position with its outer end lowermost to enable the attendant to easily place the sheaf thereon, the inner higher end of each apron extending slightly over and beyond the side of the machine to deliver the grain to be fed or drop with certainty into the throat or hopper of the thrashing-machine. Each apron is provided with slats or other suitable devices to catch the grain and hold the same thereon until the sheaf is ready for delivery to the throat of the machine.

At the forward end of the throat or hopper of the thrashing-machine is rigidly attached an upright post 3, which is provided at its upper end with a horizontal sleeve 4, through which passes a horizontal rod or bar 4'. To both ends of this rod or bar are loosely connected the brackets 5, which extend rearwardly over the conveying-aprons and at right angles to the direction in which said conveying-aprons move. The end of each bracket has attached thereto a tubular guide or casing 6, one of which casings is arranged over and close to each of the conveying-aprons. This casing 6 consists of two longitudinal sections of concave form in cross-section, and the ends of said sections of the casing are provided with upwardly-extending arms or lugs 7 8, in the upper ends of which arms or lugs are journaled short shafts 9 9', which carry the sprocket-wheels 10 10'. The shaft carrying the sprocket 10' is extended beyond its bearing on one side, and on the extended end thereof is rigidly attached another sprocket 11, by means of which through suitable connections with the driving mechanism of the machine the sprockets 10 10' and the cutter-carrying belts or chains 12 are driven.

The cutter-carrying belt or chain 12 is preferably formed of a series of links 12', adapted to receive the teeth or projections on the sprocket-wheels 10 10', and on this chain at regular intervals are secured, by means to be hereinafter fully described, knives 13. Each knife 13 as it passes through the casing 6 projects through a slot 6', extending longitudinally of said casing and formed by and between the two sections thereof, and the said knives project outwardly from the belt or chain and through the casing a suitable distance to come in contact with and sever the band of a sheaf of grain as it is carried by the conveying-apron 1 toward the throat or hopper of the thrashing-machine.

The rear end of the casing 6 is attached to a bracket 14, similar in construction to the front bracket 5, and at its rear end said bracket 14 is provided on either side with a projection or pin 15, which fits snugly within a vertical slot 16, or an equivalent way or guide may be used.

The knives 13 are preferably curved somewhat to give a shear cut to the band, and at their lower ends said knives are rigidly attached to a block 17, which is tightly clamped to blocks 18, made integral with or suitably attached to a link of the cutter-carrying belt. To the belt 12 on either side of the block 17 are tightly clamped the blocks 18', and it will be noted that the blocks 17 18 are of greater length than the width of the links of the belt or chain 12, so as to project beyond the sides of the belt, whereby the blocks are adapted to ride against the inner surfaces of the sides of the casing 6, and thus serve as guides to keep the knives in the center of the slot between the members of said casing as they are carried through the casing by the belt 12.

The under edge of each section of the casing 6 is serrated or notched at 6', so as to grasp and detain the sheaf as it travels along with the conveyer-apron 1 under such casing to further insure the cutting of the band on said sheaf by the knife 13.

To the frames in which the rollers 2 2' are journaled is attached an upright guide 19, formed of a piece of sheet metal or other suitable material, which serves as a guide to the attendant in placing the sheaves on the conveyer-apron 1 and also prevents the sheaves from falling off from said belt.

The cutting mechanism is protected from injury by the weather, &c., by means of a casing 20, which is suitably secured around the same.

The operation of my invention is simple, and may be briefly stated as follows: The thrashing-machine having been put in motion, an attendant places a sheaf of grain to be thrashed on either of the conveyer-aprons 1, which carries the sheaf toward the hopper of the thrashing-machine. As the sheaf passes under the suspended casing 6 one of the knives 13, carried by the belt 12, which, as before stated, travels at right angles to the path of movement of the conveyer-apron, cuts the band by which the sheaf is held together, and the loose grain passes on into the throat or hopper of the machine. As the brackets 5 14, which support the band-cutting mechanism, are respectively pivotally connected to the supporting bar or rod 4' and provided with the pins or projections 15, which fit in the vertical slot 16, the cutting mechanism is capable of a vertical movement to permit the passage of a larger sheaf than the sheaves to which the mechanism is adjusted, and at the same time the cutter mechanism is adapted for operation on the sheaf as it passes thereunder.

Changes in the form and proportion of parts and details of construction can be made without departing from the spirit or sacrificing the advantages of my invention.

Having thus described my invention, what I claim as new, and desire to secure by Letters Patent, is—

1. The combination, with the throat or hopper of a thrashing-machine, of an endless conveyer-apron arranged to deliver grain over the side of the throat, a sectional slotted casing suspended over the inner end of the conveyer-apron, a cutter-belt partly housed within said sectional casing and carrying the cutters or knives which protrude below the casing through the slot therein, and the upper casing 20, which incloses said cutter-belt, substantially as described.

2. The combination, with the throat or hopper of a thrashing-machine, of an endless conveyer-apron arranged to deliver grain over the side of the throat, the suspended casing over the inner end of the conveyer and constructed of two longitudinal sections which provide longitudinal slots and have bearings for the cutter-belt shafts, the shafts journaled in said bearings, the cutter-belt supported and operated by said shafts and housed partly within the sectional casing, the cutters or knives carried by the belt and arranged to protrude through the slot in the lower side of the casing, and the upper imperforate casing which incloses the cutter-belt, substantially as described.

3. A band-cutter for thrashing-machines, comprising the casing constructed of the longitudinal hollow sections and having at the ends the upwardly-extending lugs, shafts journaled in said lugs, a belt or chain passing over sprockets on said shafts and carrying the knives or cutters which protrude through said casing, and mechanism, substantially as described, for rotating the shafts and feeding the chain, substantially as shown and described.

4. A band-cutter for thrashing-machines, comprising the casing constructed of two hollow sections provided at the ends with upwardly-extending lugs and having its lower surface or edge serrated, shafts journaled in the lugs at the ends of said casing, a belt or chain passing over sprockets on the shafts, the knives or cutters attached to said chain, the guide-blocks secured to the chain on either side of each knife or cutter, and means, substantially as described, for operating the cutter-belt, substantially as shown and described.

5. The combination, with the throat of a thrashing-machine and a conveyer arranged to deliver grain over the side of the machine, of a vertically-movable casing suspended over said conveyer and consisting of longitudinal sections arranged to form the longitudinal slot in its lower side, and a cutter-carrying chain or belt carried by said sectional casing and provided with the knives which protrude through the slot in the lower side of the casing, substantially as described.

6. The combination, with the throat of a thrashing-machine and the conveyers arranged on opposite sides of the throat to deliver the grain over the sides thereof, of the casings arranged over the conveyers and supporting the traveling cutter-carrying belts or chains, the fixed standard at one end of said casings, the brackets connected to the casings and to the standard, and the arms attached to the opposite ends of the casings and supported in vertical guides or ways, substantially as described.

7. In a band-cutting mechanism for thrashing-machines, the combination of a sectional casing having a longitudinal slot in its lower side, an endless belt or chain supported by said casing and operating therein, the cutters or knives fixed centrally to the belt and projecting through the slot in the lower side of the casing, and the guide operating in connection with the belt and casing to hold the belt and cutters centrally within the casing, substantially as described.

8. In a band-cutting mechanism for thrashing-machines, the combination of a sectional casing having a longitudinal slot in its lower side, the endless chain or belt supported by the casing and operating therein, the cutters fixed centrally to the belt and projecting through the slot in the casing, and the guides carried by the belt and projecting laterally from the same to ride against the inner sides of the casing, for the purpose described, substantially as set forth.

9. In a band-cutting mechanism for thrashing-machines, the combination of a sectional slotted casing, the endless belt supported by the casing and operating therein, and the knives or cutters fixed to the belt and provided with the guide-blocks which project laterally beyond the sides of the belt and which ride against the inner sides of the sectional casing, substantially as described.

In testimony whereof I affix my signature in presence of two witnesses.

JOHN P. MONNETT.

Witnesses:
ISAAC CAHILL,
D. C. CAHILL.